(12) United States Patent
Mass et al.

(10) Patent No.: US 11,720,634 B2
(45) Date of Patent: Aug. 8, 2023

(54) AUTOMATIC GENERATION OF CLARIFICATION QUESTIONS FOR CONVERSATIONAL SEARCH

(71) Applicant: International Business Machines Corporation, Armonk, NY (US)

(72) Inventors: Yosi Mass, Ramat Gan (IL); Haggai Roitman, Yoknea'm Elit (IL); Doron Cohen, Gilon (IL)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 17/195,673

(22) Filed: Mar. 9, 2021

(65) Prior Publication Data
US 2022/0292139 A1 Sep. 15, 2022

(51) Int. Cl.
*G06N 20/00* (2019.01)
*G06F 16/9032* (2019.01)
*G06F 40/30* (2020.01)
*G06F 40/279* (2020.01)

(52) U.S. Cl.
CPC ...... *G06F 16/90332* (2019.01); *G06F 40/279* (2020.01); *G06F 40/30* (2020.01); *G06N 20/00* (2019.01)

(58) Field of Classification Search
CPC .. G06F 16/90332; G06F 40/279; G06F 40/30; G06N 20/00
See application file for complete search history.

(56) References Cited

U.S. PATENT DOCUMENTS 9,805,718 B2 10/2017 Ayan
11,394,799 B2 † 7/2022 Jackson
2020/0005117 A1 1/2020 Yuan

FOREIGN PATENT DOCUMENTS

CN 108763548 A 11/2018

OTHER PUBLICATIONS

Hashemi, Guided Transfomer: Leveraging Multiple External Sources for Representation Learning in Conversational Search, 2020, Association for Computing Machinery, whole document (Year: 2020).*

(Continued)

*Primary Examiner* — Sonia L Gay
(74) *Attorney, Agent, or Firm* — Dvir Gassner

(57) ABSTRACT

Training a machine learning language model to generate clarification questions for use in conversational search, including: Obtaining multiple dialogs between users and agents, each dialog including messages exchanged between a user and an agent, wherein one of the messages of each dialog includes a reference to a solution document provided by the agent. For each of the dialogs, operating a search engine to retrieve a text passage, relevant to at least one of the messages of the respective dialog, from the respective solution document. Training a machine learning language model to generate a new clarification question given at least one new message and multiple new text passages, wherein the training is based on a training set which comprises, for each of the dialogs: said at least one of the messages of the respective dialog, and the text passage retrieved for the respective dialog.

20 Claims, 3 Drawing Sheets

(56) References Cited

OTHER PUBLICATIONS

Zamani, Generating Clarifying Questions for Information Retrieval, 2020, WWW'20, whole document (Year: 2020).*

Mohammad Aliannejadi et al., "Asking Clarifying Questions in Open-Domain Information-Seeking Conversations," SIGIR '19, Jul. 21, 2019.

Mohammad Aliannejadi et al., "ConvAI3: Generating Clarifying Questions for Open-Domain Dialogue Systems (ClariQ)," Online at https://convai.io/ConvAI3_ClariQ2020.pdf, Jul. 8, 2020.

Sudha Rao et al., "Answer-based Adversarial Training for Generating Clarification Questions," Proceedings of NAACL-HLT 2019, pp. 143-155, Jun. 2, 2019.

\* cited by examiner
† cited by third party

AUTOMATIC GENERATION OF CLARIFICATION QUESTIONS FOR CONVERSATIONAL SEARCH

BACKGROUND

The invention relates to the field of computerized conversational search.

A key task in computer-era information and knowledge discovery is the retrieval of relevant information given a user's information need. With the growing abundance and diversity of available textual knowledge sources, it has become increasingly difficult for users, even ones experienced in searching, to obtain relevant information from these sources. Many users will not be satisfied by the first response of a search engine to their query, and will need to perform several rounds with the search engine in order to distill relevant information. In many cases, the lack of proper mechanisms for processing complex information searching tasks leads to unsuccessful results.

To accomplish such complex information searching tasks, a new paradigm of search has emerged—conversational search. Conversational search goes beyond the traditional ad-hoc (also "one-shot") retrieval paradigm, by guiding the user through the information distillation process: the user issues an initial query, the conversational search system presents a clarification question, the user answers the clarification question, and this process of clarification questions and answers continues until the system is able to provide, based on the accumulating answers, a final resolution to the user's problem or information need.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a computer-implemented method comprising the following automated steps: obtaining multiple dialogs between users and agents, wherein: each of the dialogs comprises messages exchanged between one of the users and one of the agents, and one of the messages of each of the dialogs comprises a reference to a solution document provided by the respective agent; for each of the dialogs, operating a search engine to retrieve a text passage, relevant to at least one of the messages of the respective dialog, from the respective solution document; and training a machine learning language model to generate a new clarification question given at least one new message and a multiple new text passages, wherein the training is based on a training set which comprises, for each of the dialogs: said at least one of the messages of the respective dialog, and the text passage retrieved for the respective dialog.

Another embodiment is directed to a system comprising: at least one hardware processor, and a non-transitory computer-readable storage medium having program code embodied therewith, the program code executable by said at least one hardware processor to, automatically: obtain multiple dialogs between users and agents, wherein: each of the dialogs comprises messages exchanged between one of the users and one of the agents, and one of the messages of each of the dialogs comprises a reference to a solution document provided by the respective agent; for each of the dialogs, operate a search engine to retrieve a text passage, relevant to at least one of the messages of the respective dialog, from the respective solution document; and train a machine learning language model to generate a new clarification question given at least one new message and a multiple new text passages, wherein the training is based on a training set which comprises, for each of the dialogs: said at least one of the messages of the respective dialog, and the text passage retrieved for the respective dialog.

A further embodiment is directed to a computer program product comprising a non-transitory computer-readable storage medium having program code embodied therewith, the program code executable by at least one hardware processor to, automatically: obtain multiple dialogs between users and agents, wherein: each of the dialogs comprises messages exchanged between one of the users and one of the agents, and one of the messages of each of the dialogs comprises a reference to a solution document provided by the respective agent; for each of the dialogs, operate a search engine to retrieve a text passage, relevant to at least one of the messages of the respective dialog, from the respective solution document; and train a machine learning language model to generate a new clarification question given at least one new message and a multiple new text passages, wherein the training is based on a training set which comprises, for each of the dialogs: said at least one of the messages of the respective dialog, and the text passage retrieved for the respective dialog.

In some embodiments, said at least one of the messages comprises the respective clarification question of each of the dialogs, such that: (a) for each of the dialogs, the text passage retrieved by the search engine is relevant at least to the respective clarification question, and (b) the training set comprises, for each of the dialogs, the respective clarification question.

In some embodiments, said at least one of the messages further comprises an answer of the respective user to the respective clarification question of each of the dialogs, such that: (a) for each of the dialogs, the text passage retrieved by the search engine is relevant also to the respective answer, and (b) the training set further comprises, for each of the dialogs, the respective answer.

In some embodiments, said at least one of the messages comprises the respective clarification question of each of the dialogs, and all messages preceding the respective clarification question in each of the dialogs, such that: (a) for each of the dialogs, the text passage retrieved by the search engine is relevant to the respective clarification question and all the messages preceding the respective clarification question, and (b) the training set comprises, for each of the dialogs, the respective clarification question and all the messages preceding the respective clarification question.

In some embodiments, the computer-implemented method further comprises the following automated steps, or the program code is further executable to automatically: receive said at least one new message from a new user; operate a search engine to retrieve new text passages relevant to said at least one new message from a corpus containing the solution documents or other solution documents; separately apply the trained machine learning language model to each of multiple sets of input, each of the sets of input comprising said at least one new message and a different one of the new text passages, to generate a candidate clarification question for each of the sets of input;

and present the new user with a selected clarification question out of the candidate clarification questions.

In some embodiments, the computer-implemented method further comprises the following automated steps, or the program code is further executable to automatically: calculate a relevancy score for each of the candidate clarification questions, wherein the selected clarification question presented to the user is the candidate clarification question having the highest score.

In some embodiments, the computer-implemented method further comprises the following automated steps, or the program code is further executable to automatically: receive, in response to the presentation of the selected clarification question, a new answer from the user; and use at least one of the clarification question and the new answer to retrieve one or more additional text passages from the corpus, to satisfy an information need of the user as reflected by said at least one new message and the new answer.

In some embodiments, the computer-implemented method further comprises the following automated steps, or the program code is further executable to automatically: repeat: (a) said receive of said at least one new message, said operate of said search engine to retrieve said new text passages, said separately apply, and said present, and (b) said receive of said new answer, wherein (a) and (b) are performed with the new answer instead of or in addition to said at least one new message; and cease said repeating upon receiving an indication that an information need of the user is satisfied.

In some embodiments of the computer-implemented method, the automated steps are executed by at least one hardware processor of the computer in which the method is implemented.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
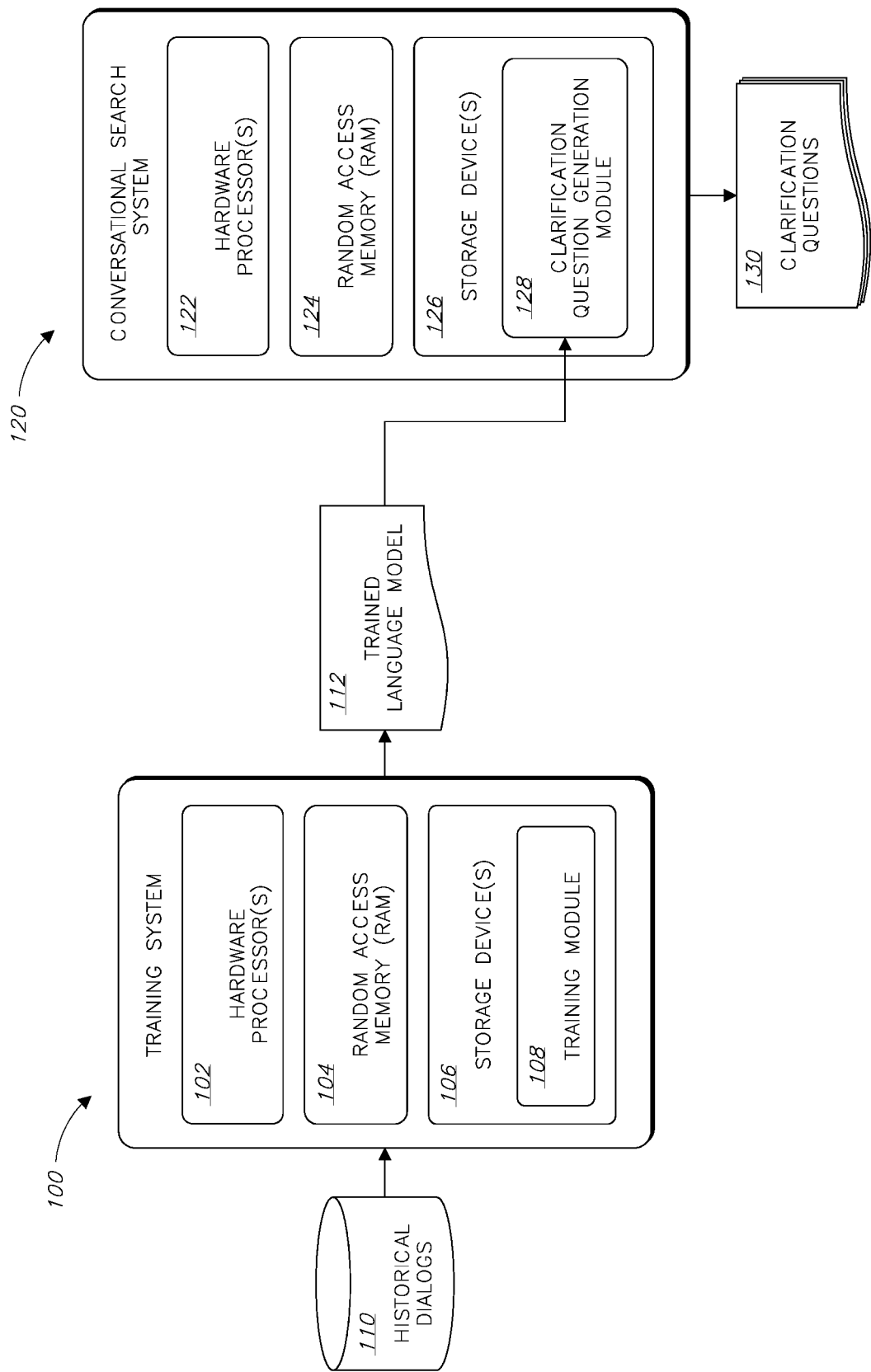
FIG. 1 is a block diagram of an exemplary configuration for training a language model to generate clarification questions, and for inferring suitable clarification questions during operation of a conversational search system, according to an embodiment.

Disclosed herein are a system, method, and computer program product for generating clarification questions to be used in conversational search.

The generation of clarification questions may be based on an advantageous training regime of a machine learning language model, in which real dialogs previously conducted between users (e.g., customers of an organization) and agents (e.g., customer support representatives of the organization) are leveraged for learning relevant clarification questions given an initial user query.

Such dialogs typically include multiple messages (also "rounds") exchanged between the user and the agent, often starting with an initial query by the user, continuing with a series of clarification questions asked by the agent and answered by the user, and ending with the agent providing a resolution to the user's problem, commonly in the form of a hyperlink to a relevant solution document. Naturally, however, since the dialog is between humans, it may slightly deviate from that structure, given the conversational styles of the humans involved. Also, the parties to the conversation need not necessarily have a customer-supplier relationship; these could be any two persons engaged in conversation in which one person (termed "agent" for convenience) assists the other (termed "user" for convenience) with a problem.

Before the training of the language model commences, one or more of the initial query, the clarification question(s), and the reference to the solution document may be automatically extracted from the dialogs, for example using predefined rules; this is optional, however. Next, a search engine may be operated to retrieve a text passage relevant to at least one of the exchanged messages (such as one or more of the messages preceding the clarification question, or one or more of these messages plus the clarification question, the user answer to the clarification question, one or more of these messages plus the clarification question plus the user answer, or just the clarification question) from the solution document associated with the respective dialog, by accessing the solution document through its reference (e.g., hyperlink). This may be a conventional search engine of the type especially configured for retrieving the most relevant text passage from a textual corpus.

Then, the language model may undergo training, in which it learns to generate a new clarification question given at least one new message and a multiple new text passages; the training may be based on a training set which includes, for each of the dialogs: the at least one message and retrieved text passage.

At inference, the trained language model may be used as follows: At least one new message is received from a user, such as an initial query submitted by the user, and/or a series of multiple messages exchanged between the user and a conversational search system. The search engine is operated to retrieve new text passages relevant to the at least one new message from the corpus containing the solution documents. The trained language model is separately applied to each of multiple sets of input, each set including the at least one new message and a different one of the new passages. This generates a candidate clarification question for each of the sets of input. These candidate clarification questions may then be scored based on a scoring mechanism described further below, and the highest-scoring candidate is selected to be presented to the new user.

The described inference may take place during operation of a conversational search system which is conventionally configured to orchestrate the back-and-forth rounds with the user, and advantageously relies on the above inference process for generation of suitable clarification questions. Given the answers provided by the user to the clarification questions, the conversational search system may be able to provide the user with one or more final search results that satisfy his or her information need.

Reference is now made to FIG. 1, which shows a block diagram of an exemplary configuration for training a language model to generate clarification questions, and for inferring suitable clarification questions during operation of a conversational search system. Accordingly, the illustrated configuration includes a training system 100 for training the language model, a conversational search system 120, and clarification question generation module 128 which is either included in system 120 as shown, or is disposed externally to system 120 but maintained in functional association with it, such as via network connection; for example, clarification question generation module 128 may be included in a server (not shown) that is configured to receive requests for clarification questions from conversational search system 120 via a network connection in real time, during conversation of system 120 with a user, and return one or more suitable clarification questions via the network connection.

Training system 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a training module 108. The software components may include an operating system having various software components and/or drivers for controlling and managing general system tasks (e.g., memory management, storage device control, power management, etc.), and facilitating communication between various hardware and software components.

Training system 100 may operate by loading instructions of training module 108 into RAM 104 as they are being executed by processor(s) 102. The instructions of training module 108 may cause training system 100 to access a database of historical dialogs 110, train a language model, and output a trained language model 112. This is discussed in greater detail with reference to FIG. 2, below.

Training system 100 as described herein is only an exemplary embodiment of the present invention, and in practice may be implemented in hardware only, software only, or a combination of both hardware and software. Training system 100 may have more or fewer components and modules than shown, may combine two or more of the components, or may have a different configuration or arrangement of the components. Training system 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of training system 100 may be co-located or distributed, or the system may be configured to run as one or more cloud computing "instances," "containers," "virtual machines," or other types of encapsulated software applications, as known in the art.

Conversational search system 120 is optionally a conventional conversational search system which is configured to orchestrate the back-and-forth rounds with the user in a manner known in the art and therefore not discussed here in detail. Advantageously, that conventional system is associated, according to present embodiments, with a clarification question generation module 128 which generates clarification questions in real time, every time system 120 determines that a clarification question is needed to clarify one or more messages authored by the user during a conversational search session (such as the user's initial query, and/or any other message(s)). Clarification question generation module 128 may utilize trained language model 112 to generate such clarification questions, as discussed below in greater detail with reference to FIG. 3.

Except for clarification question generation module 128, conversational search system 120 may include, similar to training system 100, one or more hardware processor(s) 122, a random-access memory (RAM) 124, and one or more non-transitory computer-readable storage device(s) 126, as well as one or more of the other types of components described above in connection with training system 100.

Conversational search system 120 may operate by loading instructions of clarification question generation module 128, and instructions of any other modules providing its conventional conversational search functionality (not shown) into RAM 124 as they are being executed by processor(s) 122.

Figure 2:
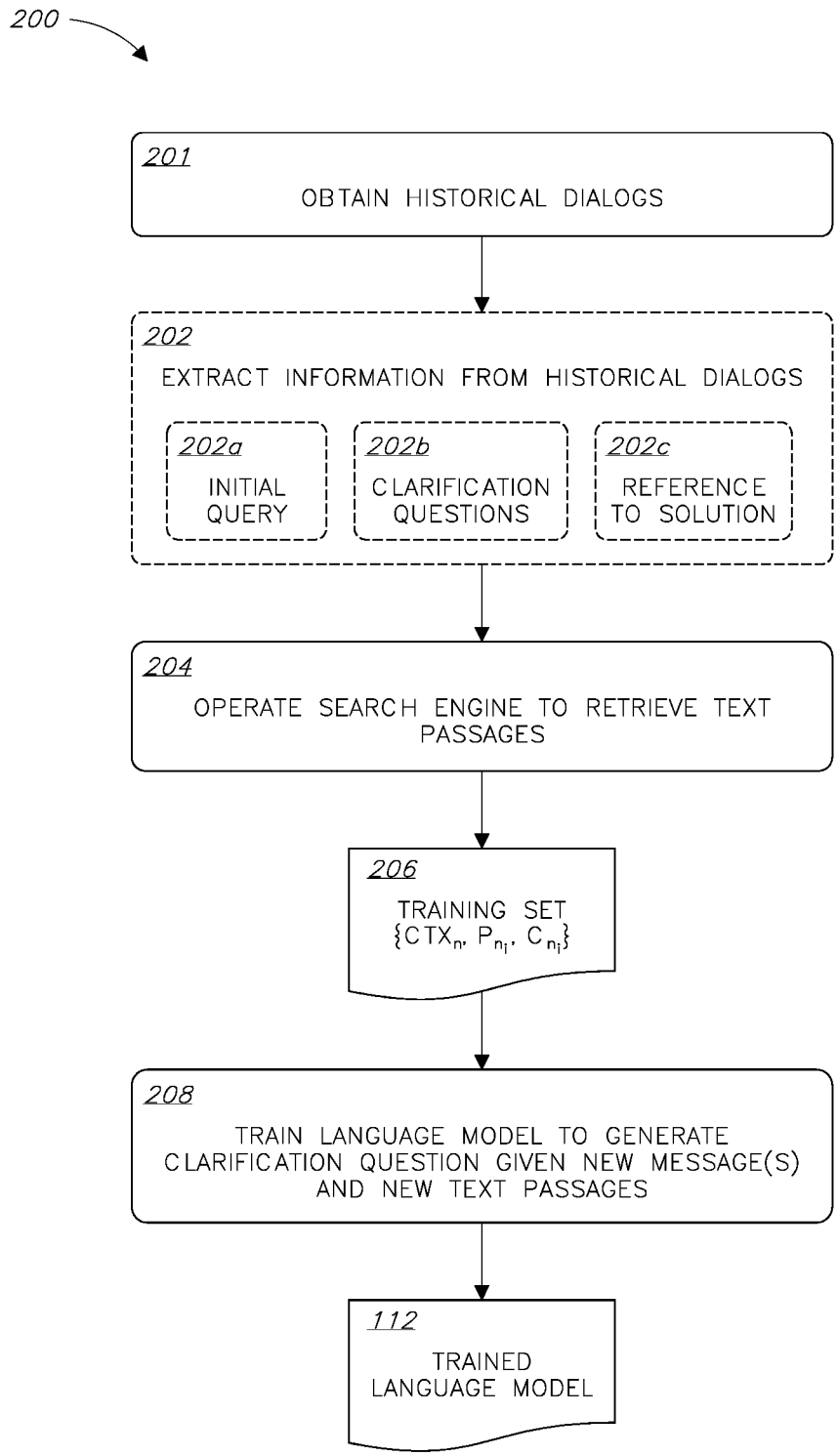
FIG. 2 is a flowchart of a method for training a language model for generation of clarification questions, according to an embodiment.

The instructions of training module 108 of training system 100 are now discussed with reference to the flowchart of FIG. 2, which illustrates a method 200 for training a language model for generation of clarification questions, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by training system 100 of FIG. 1), unless specifically stated otherwise.

In a step 201, historical dialogs between users and agents may be obtained, in order to compile a training set to train the language model. Each of these dialogs may include multiple messages exchanged between a user and an agent. These messages may include, inter alia, one or more clarification questions asked by the respective agent, as well as a reference to a solution document provided by that agent. The messages may also include an initial query by the respective user, and/or one or more answers provided by the user to the one or more clarification questions.

In a step 201, historical dialogs that took place between users and agent may be obtained, in order to compile a training set to train the language model. The dialogs may be obtained from a database, such as database 110 of FIG. 1. The term "database" is used herein to describe any collection of digitally-stored dialogs, whether they are stored in an actual database management system (DBMS) or as one or more computer files, such as, to name a few examples, plaintext files of the dialog texts, or a structured comma-delimited, tab-delimited, or eXtensible Markup Language (XML) file which includes all dialog texts. In addition, it should be noted that the dialogs may have been originally conducted via audio or video means, but then converted to text using a suitable speech-to-text engine. Alternatively, the dialogs may be been originally conducted in writing, such as in online chat sessions.

Each of the dialogs may include multiple messages exchanged between that user and an agent. These messages may include, inter alia, one or more clarification questions asked by the respective agent, as well as a reference in one of the messages to a solution document. The messages may also include an initial query by the respective user, and/or one or more answers provided by the user to the one or more clarification questions.

In an optional step 202, certain specific information may be extracted from the obtained dialogs, if training based on the entirety of each dialog is not desired. The information extraction of step 202 may include, for each of the dialogs, identifying and extracting one or more of the following: an initial query by the respective user, a clarification question by the respective agent, and a reference to a solution document provided by the respective agent.

In one illustrative embodiment, the information extracted in step 202 includes a series of exchanged messages, beginning with the first message in the respective dialog and ending with the user's answer to the agent's clarification question. Namely, the series includes what may be referred to as a "dialog context," which includes messages which are likely to closely related to the problem posed by the user—the user's query(ies), the agent's clarification question, and the user's answer to the clarification question. Multiple such series may be extracted even from a single dialog, if it includes multiple clarification questions and answers. The second and consecutive series will each include, accordingly, every message exchanged after the answer of the previous series, and until and including the subsequent answer.

Consider the following illustrative dialog, for example:
1: User: I cannot log in to my computer.
2: Agent: Thank you for contacting IBM support. May I please have your full name and customer number?
3: User: John Doe. Customer number 654321.
4: Agent: Thank you John.
5: Agent: Can you please tell me if that is a Windows, Mac, or Linux machine you are having trouble with?
6: User: It's a Linux machine.
7: Agent: Thank you. And what Linux distribution do you use?
8: User: Red Hat Enterprise Linux.
9: Agent: Okay. Can you please explain what happens when you try to log in?
10: User: I enter my username and password but get a "password incorrect" error. I am pretty certain I'm typing my password correctly.
11: Agent: I understand. The best solution will be to reset your password. You can easily reset it on your own. Please refer to https://www.ibm.com/support/kb123456 for complete instructions.
12: User: Thank you! I followed the instructions and was able to finally log it.

The first message is the user's initial query, in which the user states the problem in general terms, which are insufficient for the agent to provide an immediate solution. Of course, the initial query does not necessarily appear in the very first message, as sometimes the first one or more messages include various niceties or collection of background information not directly descriptive of the problem (such as a customer's identifying information). Still, the initial query is assumed to exist relatively early in the dialog.

In the illustrative dialog shown above, following the initial query in message no. 1, messages are exchanged between the user and the agent until a final resolution to the problem is offered by the agent in message no. 11. Some of these messages include clarification questions asked by the agent, such as "what Linux distribution do you use?" or "Can you please explain what happens when you try to log in?". As more and more clarification questions get asked by the agent and answered by the user, the agent is able to narrow down the problem and provide the user with a solution. In the above example, the agent was able to determine that the user got locked out of his operating system account in a Red Hat Enterprise Linux machine, and referred the user to a solution document at the agent's organization website, in which the steps to reset the password in that specific computer environment are explained. The user later confirmed he was able log in to his account after following the instructions in the solution document; however, not all dialogs include such indication from the user of successful problem resolution, and many dialogs terminate after the user is provided with the proposed solution.

In the illustrative dialog shown above, the information extracted in step 202 may include a first series of messages consisting of messages 1 through 3; a second series consisting of messages 4 through 6; a third series consisting of messages 7 and 8; a fourth series consisting of messages 9 and 10, and optionally also 11. As an alternative, each series may include also all preceding series, such that the first series includes messages 1-3, the second series includes messages 1-6, the third series includes messages 1-8, and the fourth series includes messages 1-10 (or 1-11).

Although the exact order of message exchange may vary between different dialogs, method 200 may still be able to extract the requisite information from all such dialogs based on the following principles:

The initial query by the user may be extracted from each dialog, in a sub-step 202*a*, using a rule that considers a combination of factors such as early position of the message in the dialog, certain keywords appearing in the message (e.g., negation words such as "not," "cannot," "no," or error-related keywords such as "error," "problem," "fail," "crash," etc.), and of course—the authoring party being the user and not the agent. Alternatively, a machine learning model may be used to identify the initial query, by first training such model on a training set which includes dialogs and a manually-labeled initial query in each dialog. Either way, the initial query is not necessarily a full message, but can be a smaller part of a longer message, such as one or more sentences out of a greater number of sentences, or a shorter phrase out of a longer sentence.

One or more clarification questions may be extracted from each dialog, in a sub-step 202*b*, using a rule that considers a combination of factors, such as a question mark appearing in a message, the existence of one or more interrogative words in a message (e.g., what, which, when, where, who, whom, whose, why, and how), the lack of keywords in a message that indicate niceties or that request background information unrelated to the problem, and of course—the authoring party being the agent and not the user. Alternatively, a machine learning model may be used to identify the clarification question(s), by first training such model on a training set which includes dialogs and one or more manually-labeled clarification questions in each dialog. Either way, each clarification question is not necessarily a full message, but can be a smaller part of a longer message, such as one or more sentences out of a greater number of sentences, or a shorter phrase out of a longer sentence.

In one exemplary embodiment, the following rules may be used to identify and extract clarification questions: First, extract only sentences in agent utterances that contain a question mark. Second, look for question words in these sentences (e.g., what, which, when, where, who, whom, whose, why, and how, did, etc.) and consider only the text between such a word and the question mark. Third, if no question words were found, run the sentence with the question mark through Allennlp's constituency parser (Joshi, V. et al., "Extending a Parser to Distant Domains Using a Few Dozen Partially Annotated Examples," Proceedings of the 56th Annual Meeting of the Association for Computational Linguistics, 2018, pp. 1190-1199), and keep sentences with a Penn Treebank clause type of SQ (inverted yes/no question, or main clause of a wh-question, following the wh-phrase in SBARQ) or SBARQ (direct question introduced by a wh-word or a wh-phrase.). The Penn Treebank is a corpus containing millions of words in American English, annotated for part-of-speech (POS) information, skeletal syntactic structure, predicate argument structure, etc. See Taylor A., Marcus M., Santorini B. (2003) The Penn Treebank: An Overview. In: AbeilléA. (eds) Treebanks. Text, Speech and Language Technology, vol 20. Springer, Dordrecht.

The rules of this exemplary embodiment can detect question-type sentences. However, to filter out questions that are merely niceties ("chit-chat" questions), a fourth rule may be used: The detected question and its answer (the subsequent user's utterance), are used as a passage retrieval query applied by the search engine (of the type discussed below) to a corpus containing the solution documents; if the query did not yield a passage from the respective solution document of that dialog in the top-N results (e.g., 3, 4, 5, or more top results), the detected question is determined to be a nicety and is discarded. Conversely, if a passage from the respective solution document of that dialog did appear in the top-N results, the detected question is determined to be a proper clarification question.

Optionally, only clarification questions whose answer by the user is positive may be extracted. For example, the user's message immediately following the clarification question may be analyzed, to check whether it begins with or includes a prominent negative or neutral term. For instance, such term may include a plain "no," but also terms like "I don't know" or "I don't understand the question." If such terms exist in the user's answer, then the preceding clarification question may be omitted and not used for training since it was probably not useful in advancing the dialog towards resolution.

Optionally, user answers to clarification questions are also extracted in step 202. Such user answers may either be naively extracted by extracting the user's message which immediately follows a clarification question, or extracted based on more sophisticated rules; such rules may include, for instance, determining that the following message is an answer only if it not phrased as a question (namely, a counter-question the user asks the agent), and/or only if it does not consist of just insignificant information such as "hold on," "please wait while I check," etc. If the user's message which immediately follows the clarification question is determined not to be an answer, then the next user's message may be analyzed based on the same or similar rules, and so on and so forth.

Lastly, the reference to the solution document may be extracted from each dialog, in a sub-step 202c, using a rule that considers a combination of factors, such as the message with the reference appearing towards the end of the dialog, and a hyperlink structure of the reference, such as an "http://" or "https://" prefix, or any other structural characteristic indicative of a string of characters being a Uniform Resource Locator (URL) or, more generally, a Uniform Resource Identifier (URI). In the illustrative dialog shown above, a rule, such as a RegEx (Regular Expression) may readily determine that "https://www.ibm.com/support/kb123456" is the sought-after reference, both because of its URL structure and because it appears late in the dialog, in the second message from the end. Had the dialog included multiple URLs in various different messages of the agent, the rule would have selected (if so configured) the URL from the latest message, because it is likely that the earlier messages were authored before the agent had sufficiently narrowed down the problem.

In step 204, additional information may be retrieved in favor of compiling the training set: a search engine may be operated to retrieve a text passage relevant to at least one message of each dialog (such as the message containing the clarification question, the user answer to the clarification question, and/or one or more of the message series discussed above) from the respective solution document. This may be a conventional search engine of the type especially configured for retrieving the most relevant text passage from a textual corpus or a specific textual document. An exemplary suitable search engine is the Apache Lucene™ open source search engine, available online at https://lucene.apache.org/ (last retrieved Feb. 16, 2021). The search engine may be provided with a search query including the respective clarification question, and the solution document (or the reference thereto) to search in. The search engine may then return a text passage, such as one or more sentences, from that solution document, which passage is the most relevant to the respective clarification question.

In one exemplary embodiment, the retrieval of step 204 may utilize a cascade of scorers, and be conducted as follows:

Candidate passage ranking exploits a cascade of scorers. Let c be a dialog with n utterances (messages) $c=u_1, \ldots u_n$. Passage score is computed as a linear combination of its initial score $score_{init}(p,c)$ and the score of its enclosing solution document. Both scores may be normalized.

$$score(p,c)=\lambda*score(d)+(1-\lambda)*score_{init}(p,c)$$

$$\lambda=0.5 [\text{may use fixed equal weight}] \quad (1)$$

The initial passage score $score_{init}(p,c)$ may be computed as a weighted sum over its utterances scores $score_{ut}(p,u_i)$. Utterance scores may be discounted such that later utterances have greater effect on the passage score.

$$score_{init}(p,c)=\Sigma_{i=1}^{n}weight_{ut}(i)*score_{ut}(p,u_i)$$

$$weight_{ut}(i)=discount\_factor^{(n-i)}$$

$$discount\_factor=0.8 \quad (2)$$

Utterance score $score_{ut}(p,u)$ reflects an utterance's terms coverage by the passage, considering terms' global idf (inverse document frequency) and their (scaled) tf (term frequency). Multiple coverage scorers may be applied, which differ by their term frequency scaling schemes. Finally, the utterance score is a product of these coverage scores $score_{cov}(p,u)$:

$$score_{ut}(p,u)=\Pi_{j=1}^{m}score_{cov_j}(p,u)$$

$$m=2 [\text{two scaling schemes may be employed}]$$

$$score_{cov_j}(p,u)=\Sigma_{t\in t^p\cap t^u}idf(t)*scale_j(t,p)$$

$$t^{p,u}=t^u\cap t^p [\text{terms appearing in both}]$$

$$t^p,t^u=[\text{passage terms, utterance terms}] \quad (3)$$

Different scaling schemes provide different interpretations of terms' importance. Two tf scaling methods may be combined, one that scales by a BM25 term score, and another that scales by the minimum of tf(t) in the utterance and passage.

$$scale_1=BM25(t,p)$$

$$scale_2=\min(tf(t,p),tf(t,c)) \quad (4)$$

As steps 202 and 204 conclude, a training set 206 made up of the at least one message per each dialog (namely, at least a clarification question, but optionally the 'dialog context' discussed above, including one or more of the discussed message series which can also include user answers), clarification questions, and text passages may be compiled.

Formally expressed, training set 206 may include multiple samples, each made up of $\{CTX_n, P_{n_i}, C_{n_i}\}$, where $CTX_n$ is the dialog context of the $n^{th}$ dialog, $P_{n_i}$ is the text passage relevant to the $i^{th}$ clarification question in the $n^{th}$ dialog, and $C_{n_i}$ is the $i^{th}$ clarification question in the $n^{th}$ dialog.

Notably, in the typical case of various ones of the dialogs including more than one clarification question each ($i \geq 2$), separate samples may be created for the different clarification questions in that one dialog, each such sample including the text passage relevant specifically to that clarification question or to a respective dialog context which contains that clarification question. This may later enable, at inference, to generate the most suitable clarification question given multiple text passage possibilities.

Next, in step 208, training of the language model may commence. The language model may be a machine learning algorithm configured for natural language processing (NLP), such as an algorithm based on an artificial neural network (ANN), typically a deep neural network (DNN). An example of a suitable language model is the GPT-2 or the GPT-3 (Generative Pre-trained Transformer 2 or 3) by OpenAI of San Francisco, Calif. Those of skill in the art will recognize other NLP machine learning algorithms, now in existence or later introduced, which may be suitable for and can be readily configured to generate a clarification question given an initial query and multiple text passages.

The trained language model 112 (also shown in FIG. 1) resulting from the training may later be included in (or be accessible by) clarification question generation module 128 (FIG. 1), to be used by conversational search system 120 (FIG. 1).

Figure 3:
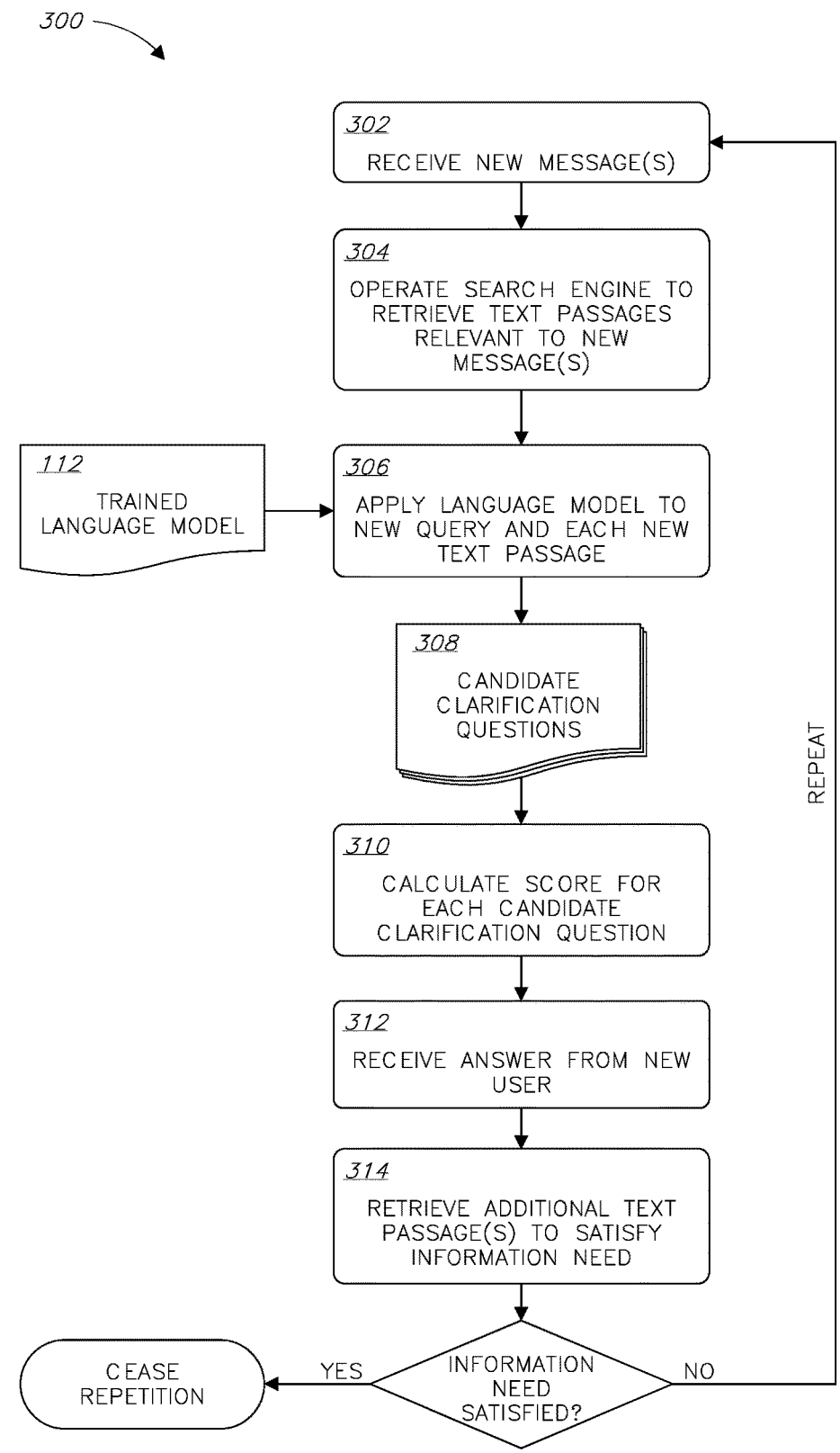
FIG. 3 is a flowchart of a method for generating clarification questions in the framework of a conversational search session, according to an embodiment.

The instructions of clarification question generation module 128, as well as the general operation steps of conversational search system 120, are now discussed with reference to the flowchart of FIG. 3, which illustrates a method 300 for generating clarification questions in the framework of a conversational search session, in accordance with an embodiment.

Steps of method 300 may either be performed in the order they are presented or in a different order (or even in parallel), as long as the order allows for a necessary input to a certain step to be obtained from an output of an earlier step. In addition, the steps of method 300 are performed automatically (e.g., by conversational search system 120 of FIG. 1), unless specifically stated otherwise.

In a step 302, one or more new messages may be received from a new user. That new message(s) may be different from the queries or other user-authored messages previously seen by training system 100 (FIG. 1).

In a step 304, the same search engine discussed above, or a different instance of the same type of search engine, may be operated to retrieve new text passages relevant to the new message(s) from a corpus containing the solution documents referred to in method 200, or, even more advantageously, other solution documents (optionally belonging in a different knowledge domain). Namely, the search engine may traverse all the solution documents in the corpus (or their indexed textual contents stored centrally, as customary in the art) and retrieve multiple text passages which it determines to be relevant to the new message(s). Optionally, the search engine is instructed to return only the top-k most relevant text passages according to its determined ranking (also "scoring") of text passages, or, alternatively, method 300 only uses the top-k text passages out of a larger number of text passages returned. k may be a number selectable by an administrator of conversational search system 120 (FIG. 1) according to preference. For example, k may be a number between 5-50 or any smaller sub-range within that wider range, such as between 5-10.

In a step 306, the trained language model 112 may be separately applied to each of multiple sets of input, each set including the new message(s) and a different one of the new text passages retrieved in step 304. This generates a set of candidate clarification questions 308, one candidate per each set of input.

In a step 310, a score may be calculated for each of the candidate clarification questions, and the candidate clarification question having the highest score may be selected and presented to the new user. Alternatively, multiple candidate clarification questions, those having the highest scores (e.g., the 2-5 highest-scoring candidates) may be presented all at once to the new user.

Step 310 may employ the following scoring mechanism, for example: For each candidate clarification question generated respective of a certain new text passage (denoted here P for convenience), the search engine may be operated to retrieve additional text passages (denoted here $P^*_1, \ldots, P^*_n$) that are relevant to the current dialog context (all messages until and including the latest user message; if this is already the $2^{nd}$ or greater repetition of steps 320-312, as will be discussed below, then current dialog context may include either all messages so far, or only messages since the previous answer to a clarification question), plus that candidate clarification question. Namely, the query applied to the search engine is the entire text of that certain candidate clarification question and the dialog context.

Then, if P turns out to be amongst $P^*_1, \ldots, P^*_n$ (for example, it is $P^*_3$), a relevancy score is assigned to the certain candidate clarification question based on a corresponding relevancy score assigned to that passage ($P^*_3$ in the example) by the search engine; that is, the search engine may inherently be configured to return, with the passages it retrieves, a relevancy score of that passage to the query—as is conventionally done by typical search engines. The score that gets assigned to that passage may either be identical to the score returned by the search engine, or be a value on some other scale which is proportional to a scoring scale used by the search engine.

If, however, P was not amongst $P^*_1, \ldots, P^*_n$, then the certain candidate clarification question may be assigned a relevancy score of zero or be simply omitted.

In case all candidate clarification questions are assigned a relevancy score of zero after employing the scoring mechanism, none of these candidates may be selected for presentation to the user, since neither of them is likely to be helpful in advancing the conversational search session towards resolution.

Then, in a step 312, an answer may be received from the new user to the selected clarification question that was presented to him or her.

In a step 314, based on the answer, conversational search system 120 (FIG. 1) may attempt to satisfy the new user's information need by retrieving one or more additional text passages from the corpus, this time those passages which are relevant not only to the new query but also to the received clarification. Namely, conversational search system 120 (FIG. 1) may satisfy the new user's information need as reflected by both the user's new query and his or her clarification.

Optionally, steps 302-312 (and optionally also 314) are repeated with the new user's answer of step 310 instead of the new message(s) of step 302 (or with the entire dialog context up to and including the new user's answer). This way, an additional clarification question becomes generated based on the progress of the conversational search session—given the latest answer received from the new user. Conversational search system 120 (FIG. 1) may also be configured not to present the same clarification question twice in the same session with a certain user, even if step 310, when repeated, outputs one of the previously-generated candidate clarification questions.

The number of repetitions may be dependent on whether the new user's information need has been satisfied after a certain repetition. For example, the new user may indicate, in the framework of the conversational search session, that his or her information need has been satisfied, which in turn will trigger cessation of the repetitions. Alternatively, conversational search system 120 (FIG. 1) may determine that the information need has been satisfied even in the absence of active user indication, such as if the new user has been idle for a certain amount of time (e.g., at least 2-10 minutes) during the session, or if he or she actively terminate the session.

In conclusion, each of methods 200 (FIGS. 2) and 300 (FIG. 3), as well as the combination of the two, may provide an improvement in the field of computerized information retrieval, and specifically in the sub-field of computerized conversational search. They each employ advantageous machine learning mechanisms to facilitate the automatic generation of clarification questions and to enable the real-time provision of these questions during a conversational search session between a user and a conversational search system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising the following automated steps:
    obtaining multiple dialogs between users and agents, wherein:
        each of the dialogs comprises messages exchanged between one of the users and one of the agents, and
        one of the messages of each of the dialogs comprises a reference to a solution document provided by the respective agent;
    for each of the dialogs, operating a search engine to retrieve a text passage, relevant to at least one of the messages of the respective dialog, from the respective solution document; and
    training a machine learning language model to generate a new clarification question given at least one new message and a multiple new text passages, wherein the training is based on a training set which comprises, for each of the dialogs: said at least one of the messages of the respective dialog, and the text passage retrieved for the respective dialog.

2. The computer-implemented method of claim 1, wherein:
    said at least one of the messages comprises the respective clarification question of each of the dialogs, such that:
        for each of the dialogs, the text passage retrieved by the search engine is relevant at least to the respective clarification question, and
        the training set comprises, for each of the dialogs, the respective clarification question.

3. The computer-implemented method of claim 2, wherein:
    said at least one of the messages further comprises an answer of the respective user to the respective clarification question of each of the dialogs, such that:
        for each of the dialogs, the text passage retrieved by the search engine is relevant also to the respective answer, and
        the training set further comprises, for each of the dialogs, the respective answer.

4. The computer-implemented method of claim 1, wherein:
    said at least one of the messages comprises the respective clarification question of each of the dialogs, and all messages preceding the respective clarification question in each of the dialogs, such that:
        for each of the dialogs, the text passage retrieved by the search engine is relevant to the respective clarification question and all the messages preceding the respective clarification question, and
        the training set comprises, for each of the dialogs, the respective clarification question and all the messages preceding the respective clarification question.

5. The computer-implemented method of claim 1, further comprising the following automated steps:
    receiving said at least one new message from a new user;
    operating a search engine to retrieve new text passages relevant to said at least one new message from a corpus containing the solution documents or other solution documents;
    separately applying the trained machine learning language model to each of multiple sets of input, each of the sets of input comprising said at least one new message and a different one of the new text passages, to generate a candidate clarification question for each of the sets of input; and presenting the new user with a selected clarification question out of the candidate clarification questions.

6. The computer-implemented method of claim 5, further comprising the following automated steps:

calculating a relevancy score for each of the candidate clarification questions, wherein the selected clarification question presented to the user is the candidate clarification question having the highest score.

7. The computer-implemented method of claim 5, further comprising the following automated steps:

receiving, in response to the presentation of the selected clarification question, a new answer from the user; and using at least one of the clarification question and the new answer to retrieve one or more additional text passages from the corpus, to satisfy an information need of the user as reflected by said at least one new message and the new answer.

8. The computer-implemented method of claim 7, further comprising the following automated steps:

repeating:
(a) said receiving, said operating, said separately applying, and said presenting of claim 5, and
(b) said receiving of claim 7,
with the new answer instead of or in addition to said at least one new message; and ceasing said repeating upon receiving an indication that an information need of the user is satisfied.

9. The computer-implemented method of claim 1, wherein said automated steps are executed by at least one hardware processor of the computer in which the method is implemented.

10. A system comprising:
(a) at least one hardware processor; and
(b) a non-transitory computer-readable storage medium having program code embodied therewith, the program code executable by said at least one hardware processor to, automatically:

obtain multiple dialogs between users and agents, wherein:
each of the dialogs comprises messages exchanged between one of the users and one of the agents, and
one of the messages of each of the dialogs comprises a reference to a solution document provided by the respective agent, for each of the dialogs, operate a search engine to retrieve a text passage, relevant to at least one of the messages of the respective dialog, from the respective solution document, and train a machine learning language model to generate a new clarification question given at least one new message and a multiple new text passages, wherein the training is based on a training set which comprises, for each of the dialogs: said at least one of the messages of the respective dialog, and the text passage retrieved for the respective dialog.

11. The system of claim 10, wherein:
said at least one of the messages comprises the respective clarification question of each of the dialogs, such that:
for each of the dialogs, the text passage retrieved by the search engine is relevant at least to the respective clarification question, and the training set comprises, for each of the dialogs, the respective clarification question.

12. The system of claim 11, wherein:
said at least one of the messages further comprises an answer of the respective user to the respective clarification question of each of the dialogs, such that:
for each of the dialogs, the text passage retrieved by the search engine is relevant also to the respective answer, and
the training set further comprises, for each of the dialogs, the respective answer.

13. The system of claim 10, wherein:
said at least one of the messages comprises the respective clarification question of each of the dialogs, and all messages preceding the respective clarification question in each of the dialogs, such that:
for each of the dialogs, the text passage retrieved by the search engine is relevant to the respective clarification question and all the messages preceding the respective clarification question, and
the training set comprises, for each of the dialogs, the respective clarification question and all the messages preceding the respective clarification question.

14. The system of claim 10, wherein the program code is further executable by said at least one hardware processor to:

receive said at least one new message from a new user;
operate a search engine to retrieve new text passages relevant to said at least one new message from a corpus containing the solution documents or other solution documents;
separately apply the trained machine learning language model to each of multiple sets of input, each of the sets of input comprising said at least one new message and a different one of the new text passages, to generate a candidate clarification question for each of the sets of input; and
present the new user with a selected clarification question out of the candidate clarification questions.

15. The system of claim 14, wherein the program code is further executable by said at least one hardware processor to:

calculate a relevancy score for each of the candidate clarification questions,
wherein the selected clarification question presented to the user is the candidate clarification question having the highest score.

16. The system of claim 14, wherein the program code is further executable by said at least one hardware processor to:

receive, in response to the presentation of the selected clarification question, a new answer from the user; and
use at least one of the clarification question and the new answer to retrieve one or more additional text passages from the corpus, to satisfy an information need of the user as reflected by said at least one new message and the new answer.

17. The system of claim 16, wherein the program code is further executable by said at least one hardware processor to:

repeat:
(a) said receive, said operate, said separately apply, and said present of claim 14, and
(b) said receive of claim 16,
with the new answer instead of or in addition to said at least one new message; and cease said repeating upon receiving an indication that an information need of the user is satisfied.

18. A computer program product comprising a non-transitory computer-readable storage medium having program code embodied therewith, the program code executable by at least one hardware processor to, automatically:
- obtain multiple dialogs between users and agents, wherein:
  - each of the dialogs comprises messages exchanged between one of the users and one of the agents, and
  - one of the messages of each of the dialogs comprises a reference to a solution document provided by the respective agent;
- for each of the dialogs, operate a search engine to retrieve a text passage, relevant to at least one of the messages of the respective dialog, from the respective solution document; and
- train a machine learning language model to generate a new clarification question given at least one new message and a multiple new text passages, wherein the training is based on a training set which comprises, for each of the dialogs: said at least one of the messages of the respective dialog, and the text passage retrieved for the respective dialog.

19. The computer program product of claim 18, wherein:
said at least one of the messages comprises the respective clarification question of each of the dialogs, such that:
- for each of the dialogs, the text passage retrieved by the search engine is relevant at least to the respective clarification question, and
- the training set comprises, for each of the dialogs, the respective clarification question.

20. The computer program product of claim 19, wherein:
said at least one of the messages further comprises an answer of the respective user to the respective clarification question of each of the dialogs, such that:
- for each of the dialogs, the text passage retrieved by the search engine is relevant also to the respective answer, and
- the training set further comprises, for each of the dialogs, the respective answer.

* * * * *